US012617330B2

(12) United States Patent
Illarionov

(10) Patent No.: US 12,617,330 B2
(45) Date of Patent: May 5, 2026

(54) STRAP WINDING APPARATUS FOR LOAD SECURING STRAPS AND METHODS OF USE

(71) Applicant: Dmitrii Illarionov, Austin, TX (US)

(72) Inventor: Dmitrii Illarionov, Austin, TX (US)

( * ) Notice: Subject to any disclaimer, the term of this patent is extended or adjusted under 35 U.S.C. 154(b) by 0 days.

(21) Appl. No.: 18/810,630

(22) Filed: Aug. 21, 2024

(65) Prior Publication Data

US 2025/0214797 A1     Jul. 3, 2025

Related U.S. Application Data

(60) Provisional application No. 63/617,368, filed on Jan. 3, 2024.

(51) Int. Cl.
B60P 7/08          (2006.01)
B65H 18/08          (2006.01)

(52) U.S. Cl.
CPC ........... B60P 7/0846 (2013.01); B60P 7/0838 (2013.01); *B65H 18/08* (2013.01)

(58) Field of Classification Search
CPC ....... B60P 7/0846; B60P 7/0823; B60P 7/083; B60P 7/0853; B60P 7/0861; B60P 7/0869
See application file for complete search history.

(56) References Cited

U.S. PATENT DOCUMENTS 1,199,790 A * 10/1916 Holcomb ............. B65H 54/585
                                                        242/405.3
3,954,226 A * 5/1976 Pickering ............. B60P 7/0846
                                                        242/395

D246,785 S     12/1977 Abe et al.
4,266,740 A * 5/1981 Ramos ................... B65H 18/10
                                                        242/537

(Continued)

FOREIGN PATENT DOCUMENTS

CA          2848871 A1     10/2015
CN       108032795 A       5/2018

(Continued)

OTHER PUBLICATIONS

Ancra Cargo; Premium Cargo Strap Winder; https://semitrailers.net/shop/ancra-premium-cargo-strap-winder-50391-10/; accessed Apr. 21, 2025.

(Continued)

*Primary Examiner* — Anna M Momper
*Assistant Examiner* — Nathaniel L Adams

(57)          ABSTRACT

A strap winding apparatus for winding a strap including a bracket and a rotating shaft assembly. The bracket includes a frame having frame holes. The bracket includes a handle member extending from the frame. The handle includes a hook member. The rotating shaft assembly includes a shaft having shaft openings. The shaft connects to a crank having a grip. The hook member connects to a flatbed truck and positions the frame parallel to the side of the flatbed truck. The shaft inserts through the frame holes while positioning the crank outside of the frame. The shaft openings receive the strap. The rotating shaft assembly rotates causing the strap to wind around the shaft. The shaft is removed from the frame while retaining the strap in a wounded configuration. In one example, the rotating shaft assembly is configured to position within the frame when not in use.

2 Claims, 13 Drawing Sheets

(56) References Cited

U.S. PATENT DOCUMENTS

| | | | | |
|---|---|---|---|---|
| 4,390,141 | A * | 6/1983 | Webster | B60P 7/0846 |
| | | | | 242/395 |
| D295,949 | S | 5/1988 | Ferrell | |
| D307,239 | S | 4/1990 | Topping | |
| D390,094 | S | 2/1998 | Pamplin | |
| D396,629 | S | 8/1998 | Huggins | |
| 5,791,844 | A | 8/1998 | Anderson | |
| 5,961,061 | A | 10/1999 | Stanley | |
| 5,961,263 | A | 10/1999 | Nunez | |
| 5,975,454 | A * | 11/1999 | Potter | B60P 7/0846 |
| | | | | 242/405 |
| 6,068,210 | A | 5/2000 | Risa | |
| 6,179,534 | B1 | 1/2001 | Weckter | |
| 6,729,604 | B1 | 5/2004 | Claycomb | |
| 7,017,847 | B2 | 3/2006 | Treat | |
| 7,059,588 | B2 | 6/2006 | Goulet | |
| D526,173 | S | 8/2006 | Hudson | |
| 7,100,902 | B1 * | 9/2006 | Lu | B60P 7/0846 |
| | | | | 254/218 |
| 7,296,326 | B2 | 11/2007 | Madachy et al. | |
| 7,357,612 | B1 | 4/2008 | Paul | |
| 7,766,271 | B1 * | 8/2010 | Confoey | B60P 7/0846 |
| | | | | 242/395 |
| 7,861,382 | B1 * | 1/2011 | Madachy | B60P 7/0846 |
| | | | | 254/218 |
| D786,657 | S | 5/2017 | Woodrow | |
| 9,676,590 | B1 | 6/2017 | Berry | |
| 9,789,984 | B2 * | 10/2017 | Sikora | B65B 13/025 |
| 9,908,454 | B1 | 3/2018 | Waters, Jr. | |
| 10,099,880 | B2 | 10/2018 | Evans | |
| D845,727 | S | 4/2019 | Haynes | |
| 10,266,364 | B2 | 4/2019 | Hitsman | |
| 10,414,624 | B1 | 9/2019 | Berry | |
| 10,414,639 | B2 | 9/2019 | Downs | |
| 10,843,619 | B1 | 11/2020 | Carter | |
| 11,479,160 | B2 | 10/2022 | LeBrun | |
| 11,485,605 | B2 | 11/2022 | Sury | |
| 11,603,029 | B2 | 3/2023 | Yin | |
| D986,033 | S | 5/2023 | Renouf | |
| 2004/0007701 | A1 | 1/2004 | Goulet | |
| 2004/0175248 | A1 | 9/2004 | Ray | |
| 2006/0022104 | A1 * | 2/2006 | Treat | B60P 7/0846 |
| | | | | 248/300 |
| 2007/0045460 | A1 | 3/2007 | Cupan | |
| 2009/0194628 | A1 | 8/2009 | Taylor | |
| 2009/0302144 | A1 | 12/2009 | Baer | |
| 2010/0025645 | A1 | 2/2010 | Carlson et al. | |
| 2010/0258669 | A1 | 10/2010 | Gonzales | |
| 2012/0145820 | A1 | 6/2012 | White | |
| 2012/0273607 | A1 | 11/2012 | Bensen, IV | |
| 2015/0107066 | A1 * | 4/2015 | Lu | B60P 7/0846 |
| | | | | 24/69 ST |
| 2020/0377003 | A1 * | 12/2020 | Egigian | B60P 7/0846 |
| 2022/0363503 | A1 | 11/2022 | Jones | |
| 2023/0071990 | A1 | 3/2023 | Renouf | |
| 2023/0365367 | A1 | 11/2023 | Guenther | |

FOREIGN PATENT DOCUMENTS

| | | |
|---|---|---|
| DE | 9111109 U1 | 11/1991 |
| DE | 9208202 U1 | 11/1992 |
| DE | 29812867 U1 | 11/1998 |
| DE | 29918069 U1 | 12/1999 |
| DE | 20009516 U1 | 11/2000 |
| DE | 102007055394 A1 | 6/2009 |
| EP | 3222572 A1 | 9/2017 |
| FR | 2880335 A1 | 7/2006 |
| GB | 2381520 A | 5/2003 |
| GB | 2458326 A | 9/2009 |
| GB | 2479727 A | 10/2011 |
| GB | 2459552 B | 9/2012 |
| NL | 1033990 C1 | 10/2007 |
| SE | 0402127 L | 10/2005 |
| WO | WO-1992001623 A1 | 2/1992 |
| WO | WO-2005113398 A1 | 12/2005 |
| WO | WO-2012026805 A1 | 3/2012 |
| WO | WO-2014138777 A1 | 9/2014 |

OTHER PUBLICATIONS

Ancra Cargo; EZ-Winder 2 Handle Strap Winder; https://ancracargo. com/ez-winder-strap-winder; accessed Apr. 21, 2025.

Kinedyne LLC; Standard Strap Winder; https://kinedyne.com/ standard-strap-winder/; accessed Apr. 21, 2025.

Kinedyne LLC; Premium Strap Winder; https://kinedyne.com/ premium-strap-winder/; accessed Apr. 21, 2025.

Kinedyne LLC; Kwik Winder; https://kinedyne.com/kwik-winder/; accessed Apr. 21, 2025.

Dynelloaps; Dynello Rewinder2; https://dynello.com/products/ dynello-rewinder-2; accessed Apr. 21, 2025.

Mytee Products; Winch Strap Winder; https://www.myteeproducts. com/winch-strap-winder-new.html; accessed Apr. 21, 2025.

Cargo Equipment Corp.; Strap Winder (SKU10091); https://www. cargoequipmentcorp.com/trailer-type/flatbed/winch-straps/p/ 10091; accessed Apr. 21, 2025.

Truckspring; SW5000 Strap Winder; https://www.truckspring.com/ products/Strap-Winder_SW5000.aspx; accessed Apr. 21, 2025.

Midwest Cargo Equipment Inc.; Strap Winder; https://www. midwestcargoequipment.com/products/strap-winder; accessed Apr. 21, 2025.

* cited by examiner

10

16 12

18

20

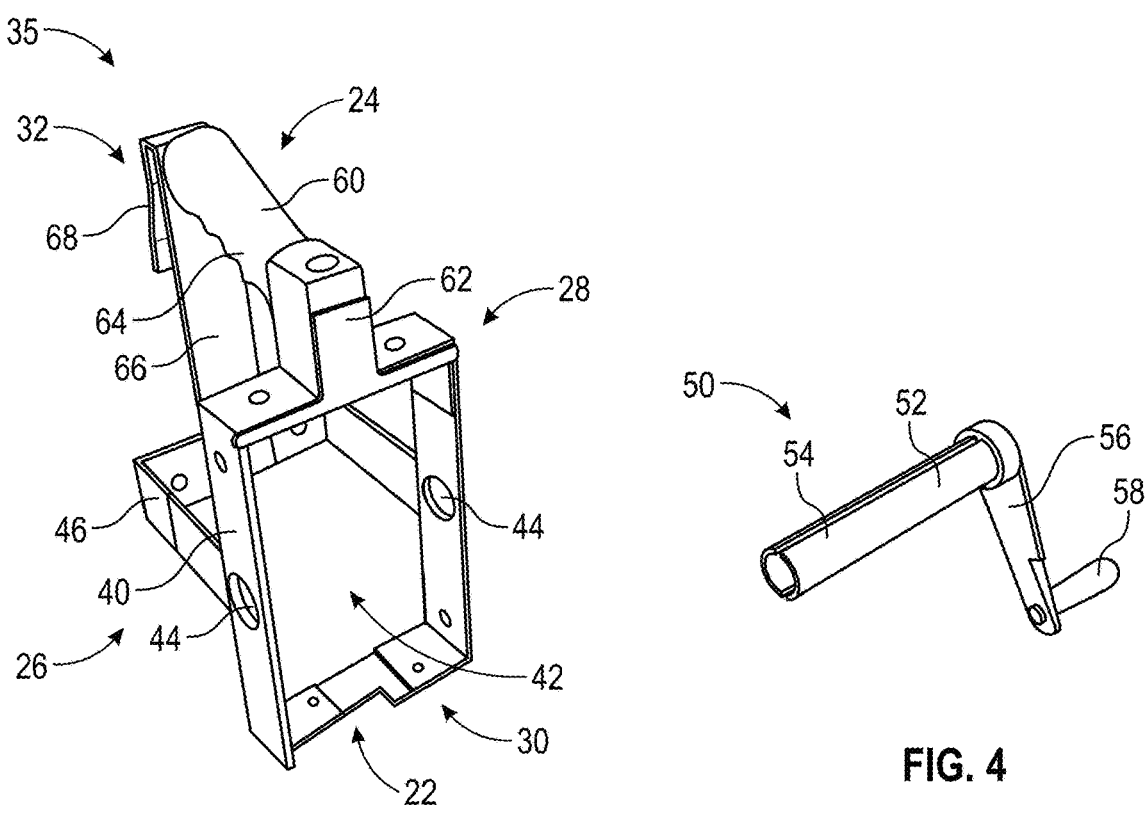
FIG. 3
FIG. 4
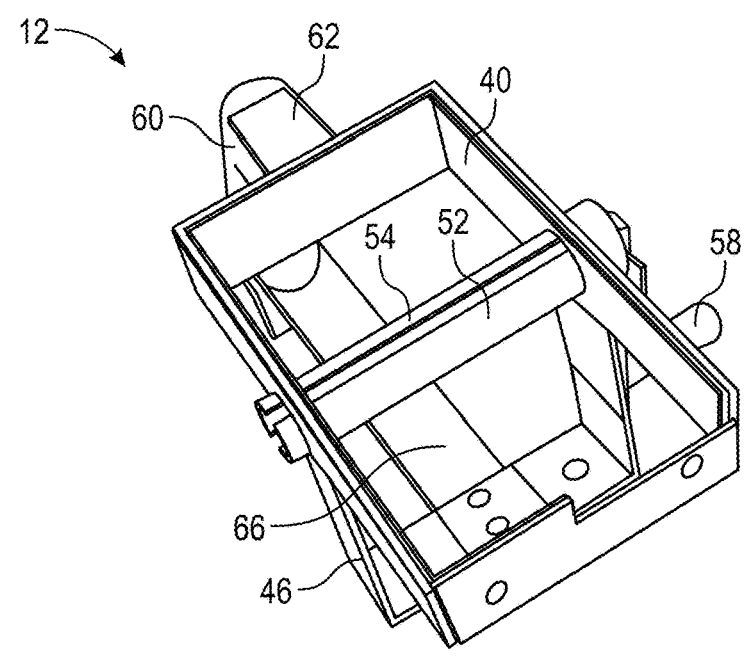
FIG. 5

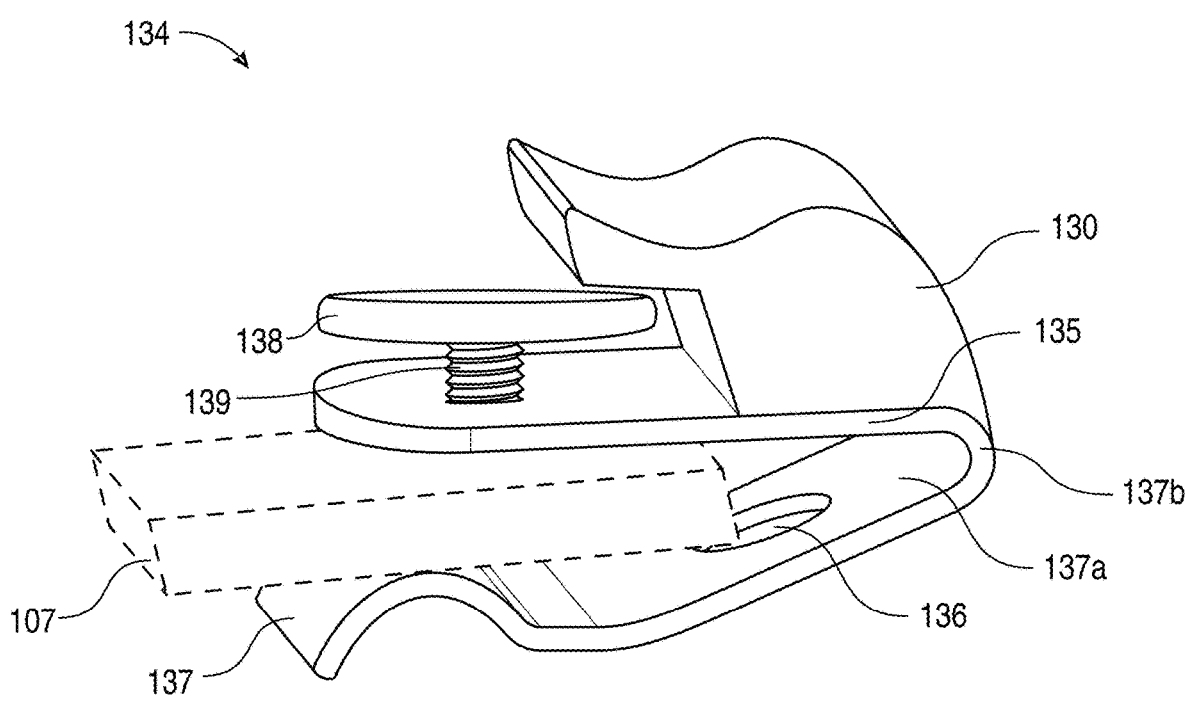
FIG. 13A
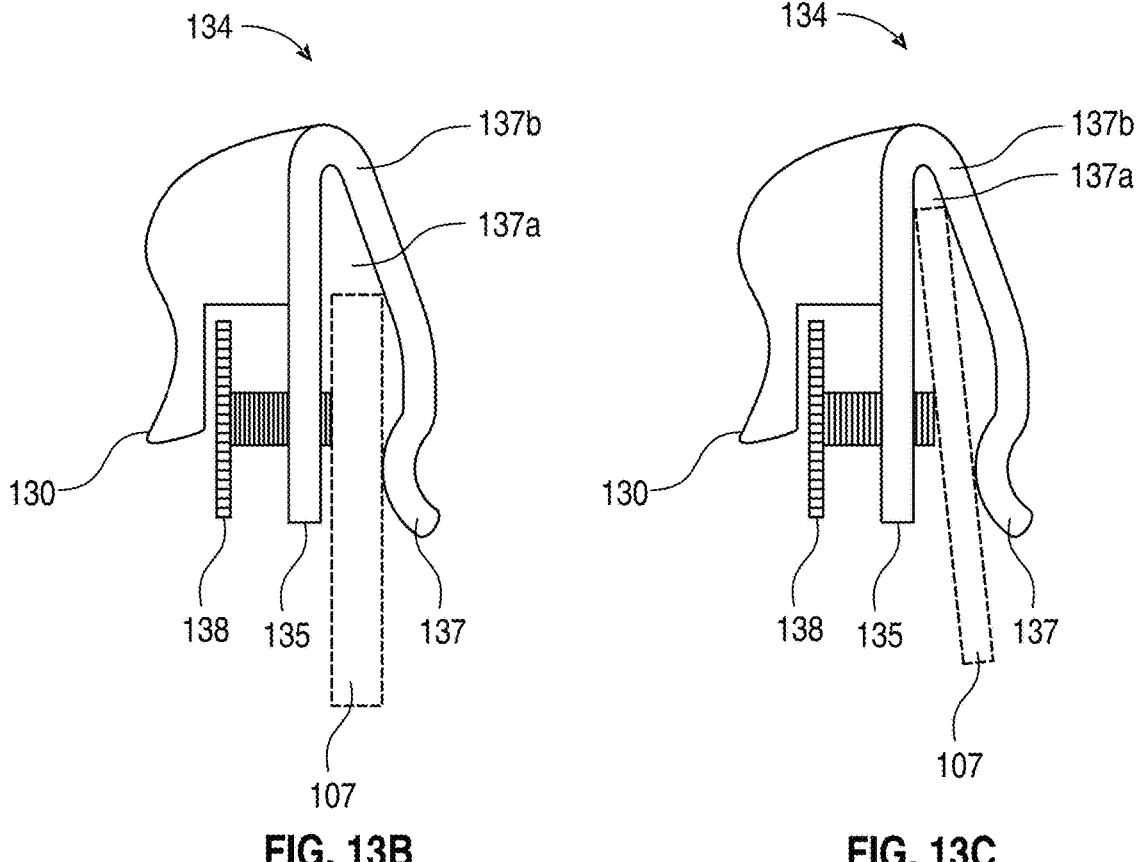
FIG. 13B　　　　　　　　FIG. 13C

STRAP WINDING APPARATUS FOR LOAD SECURING STRAPS AND METHODS OF USE

REFERENCE TO RELATED APPLICATIONS

The present application claims priority from U.S. Provisional Patent Application No. 63/617,368 filed Jan. 3, 2024, which is incorporated herein by its entirety and referenced thereto.

BACKGROUND OF THE INVENTION

Field of the Invention

The present disclosure relates to accessories used in transportation, and in particular, relates to a strap winding apparatus for winding straps.

Description of the Prior Art

It is known that articles placed on a flatbed truck are secured using cargo straps, tie-down straps or other flexible members. The cargo straps are extended over the articles and the cargo straps are fastened to a deck of the flatbed truck. After use, it is preferred to organize the cargo straps for safe storage and prevent them from tangling with other objects. Typically, the cargo straps are rolled for easy storage and transportation. Rolling of the cargo straps by hand is a time-consuming task and takes considerable effort by a user or truck driver.

In order to aid the user, strap winding tools are used by the truck driver. Several strap winding tools have been proposed in the past. One such example is disclosed in a U.S. Pat. No. 7,766,271, entitled "Strap collection device for tensioning a ratchet" ("the '271 Patent"). The '271 Patent discloses a hand activated retainment, storage and deployment device for binding straps used to secure loads on cargo transportation vehicles such as tractor trailers. The device has a winding mechanism with a spooling reel for winding excess binding strap during use and for removable storage of the strap when not deployed.

Another example is disclosed in a PCT Publication No. 2014138777, entitled "Strap winding tool" ("the '777 Publication"). The '777 Publication discloses a strap winding device comprising a pair of tines extending in length from a body, and an interface extending from the body for connection to a rotating driver for rotating the tines about an axis between the tines when the strap is placed there between. In use the rotation of the tines winds the strap around the tines.

Another example is disclosed in a U.S. Pat. No. 6,824, 339, entitled "Belt winch speed handle" ("the '339 Patent"). The '339 Patent discloses a handle for speed winding a strap back onto a belt winch having a ratchet mechanism, a winch drum and an annular cylinder is described. The speed handle generally includes an elongated arm having a grip on the upper surface adjacent the first end and a handle drum on the lower surface adjacent the second end. The handle drum includes a tapered end and is adapted to fit into the annular cylinder of a belt winch. The handler drum includes a protrusion with a tapered end, adapted to fit into an aperture on the annular cylinder. Once placed on the belt winch, the speed handle allows the user to rapidly rewind a strap back onto the winch drum.

Although the existing strap winding tools are useful, they have few problems. For example, the existing strap winding tools have a complex connection mechanism to connect to the deck of the flatbed truck. Further, they require additional tools to install and uninstall the strap winding tool from the flatbed truck.

Therefore, there is a need in the art to provide a strap winding apparatus for winding straps, the strap winding apparatus that is easy to install and uninstall from the flatbed truck.

SUMMARY OF THE INVENTION

It is an object of the present invention to provide a strap winding apparatus that avoids the drawback of known strap winding tools.

It is another object of the present invention to provide a strap winding apparatus that is easy to install and uninstall from the flatbed truck.

In order to achieve one or more objects, the present invention provides a strap winding apparatus for winding a strap. The strap winding apparatus includes a bracket and a rotating shaft assembly. The bracket includes a frame having frame holes. The bracket includes a handle member extending from the frame. The handle includes a hook member. The hook member connects to a flatbed truck and positions the frame parallel to the side of the flatbed truck. The rotating shaft assembly includes a shaft having shaft openings. The shaft openings indicate elongated slots extending along the length of the shaft and have open ends. The shaft connects to a crank having a grip. The shaft inserts through the frame holes while positioning the crank outside of the frame. The shaft openings receive the strap. The rotating shaft assembly rotates causing the strap to wind around the shaft. The shaft is removed from the frame while retaining the strap in a wounded configuration. In one example, the rotating shaft assembly is configured to position within the frame when not in use.

In one aspect of the present invention, the frame has a U-shaped member extending from the frame. Further, the frame has a support member that connects at the bottom of the handle member and the U-shaped member. The support member contacts the side of the flatbed truck. The support member, the U-shaped member and the handle member provide required strength for the frame for holding the rotating shaft assembly and to wind the strap. Further, the support member, the U-shaped member and the handle member help to position the frame at a distance from the flatbed truck and use the space between the frame and the support member for winding the strap.

In one advantageous feature of the present invention, the strap winding apparatus has a frame that is configured to receive the rotating shaft assembly when not in use. This prevents separate storage space for the rotating shaft assembly and makes it easy for storing and transporting the strap winding apparatus.

In another advantageous feature of the present invention, the handle member has a hook member that is easy to install or uninstall from the flatbed truck. In one example, the hook member has a fastener to connect the strap winding apparatus to the flatbed truck.

The features and advantages of the invention here will become more apparent in light of the following detailed description of selected embodiments, as illustrated in the accompanying FIGURES. As will be realized, the invention disclosed is capable of modifications in various respects, all without departing from the scope of the invention. Accordingly, the drawings and the description are to be regarded as illustrative in nature.

3

BRIEF DESCRIPTION OF THE DRAWINGS

The present invention will now be described in detail with reference to the drawings, which are provided as illustrative examples of the invention to enable those skilled in the art to practice the invention. It will be noted that throughout the appended drawings, like features are identified by like reference numerals. Notably, the FIGURES and examples are not meant to limit the scope of the present invention to a single embodiment, but other embodiments are possible by way of interchange of some or all of the described or illustrated elements and, further, wherein:

FIG. 3 illustrates a side perspective view of a bracket of the strap winding apparatus, in accordance with one embodiment of the present invention;

FIG. 4 illustrates a side perspective view of a rotating shaft assembly of the strap winding apparatus, in accordance with one embodiment of the present invention;

FIG. 5 illustrates the rotating shaft assembly inserted in a frame of the bracket from the side, in accordance with one embodiment of the present invention;

FIGS. 13A, 13B and 13C illustrate a hook member provided at a handle member, in accordance with one embodiment of the present invention;

DETAILED DESCRIPTION OF THE PREFERRED EMBODIMENT

The detailed description set forth below in connection with the appended drawings is intended as a description of exemplary embodiments in which the presently disclosed invention may be practiced. The term "exemplary" used throughout this description means "serving as an example, instance, or illustration," and should not necessarily be construed as preferred or advantageous over other embodiments. The detailed description includes specific details for providing a thorough understanding of the presently disclosed strap winding apparatus. However, it will be apparent to those skilled in the art that the presently disclosed invention may be practiced without these specific details. In some instances, well-known structures and devices are shown in functional or conceptual diagram form in order to avoid obscuring the concepts of the presently disclosed strap winding apparatus.

In the present specification, an embodiment showing a singular component should not be considered limiting. Rather, the invention preferably encompasses other embodiments including a plurality of the same component, and vice-versa, unless explicitly stated otherwise herein. Moreover, the applicant does not intend for any term in the specification to be ascribed an uncommon or special meaning unless explicitly set forth as such. Further, the present invention encompasses present and future known equivalents to the known components referred to herein by way of illustration.

Although the present invention describes a strap winding apparatus, it is to be further understood that numerous changes may arise in the details of the embodiments of the device. It is contemplated that all such changes and additional embodiments are within the spirit and true scope of this invention.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the invention and are not intended to limit the scope of the invention.

Various features and embodiments of a strap winding apparatus are explained in conjunction with the description of FIGURES (FIGS.) 1-17.

Figure 1:
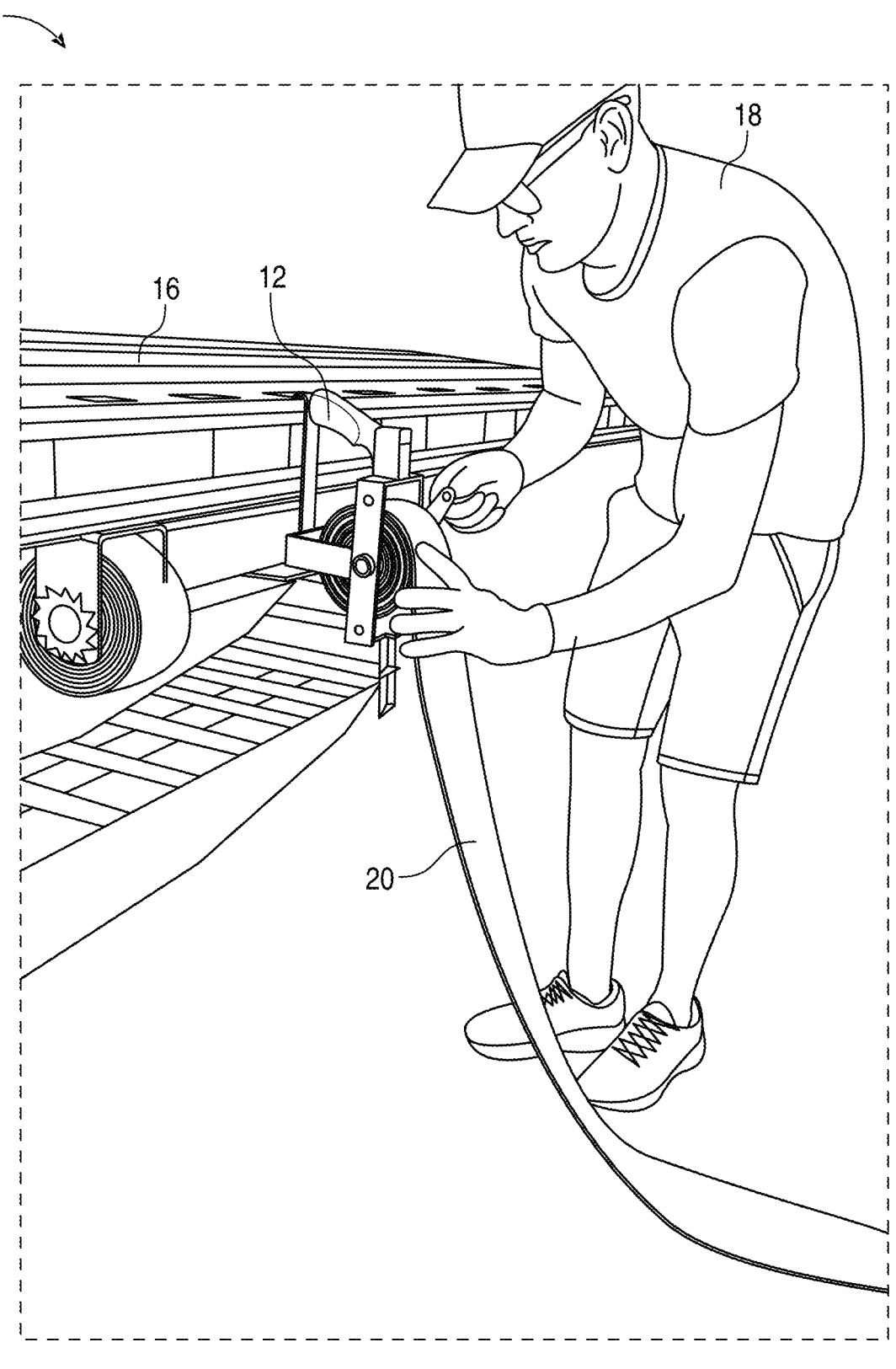
FIG. 1 illustrates an environment in which a strap winding apparatus implements, in accordance with one embodiment of the present invention.

FIG. 1 shows an environment 10 in which a strap winding apparatus 12 implements, in accordance with one embodiment of the present invention. Strap winding apparatus 12 connects to a truck 14 at its bed or deck 16. A user 18 attaches strap winding apparatus 12 to bed 16 and uses to wind/roll a strap 20. Strap 20 indicates a cargo strap or a tie-down strap. In one example, strap 20 includes, but not limited to, a ratchet strap with flat hook, a ratchet strap with wire hook, a chain anchor ratchet strap, a lasso strap, etc.

Figure 2A:
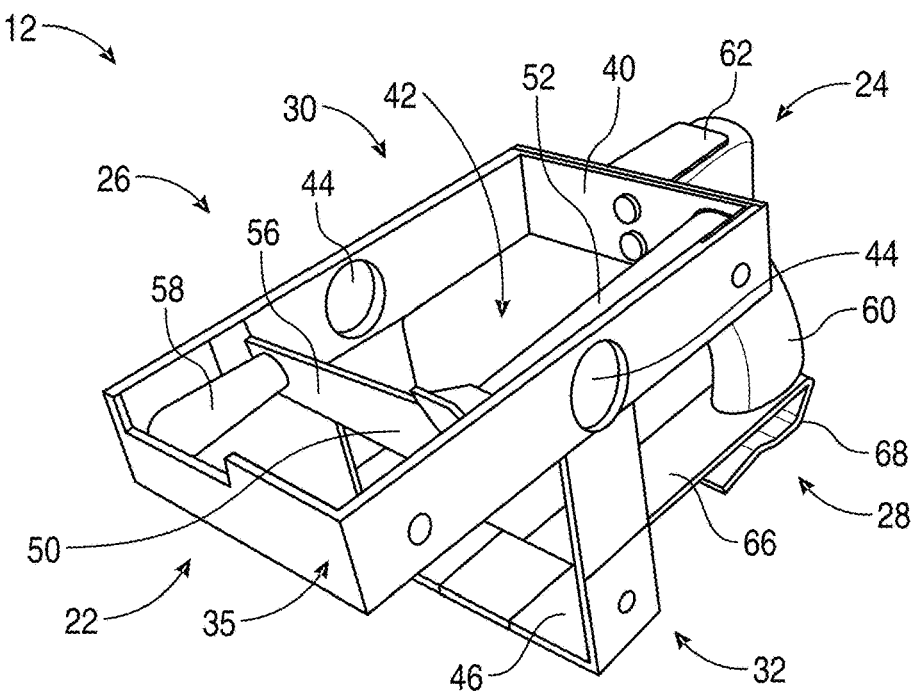
FIG. 2A and FIG. 2B illustrates a side perspective view and a bottom perspective view, respectively of the strap winding apparatus, in accordance with one embodiment of the present invention.
Figure 2B:
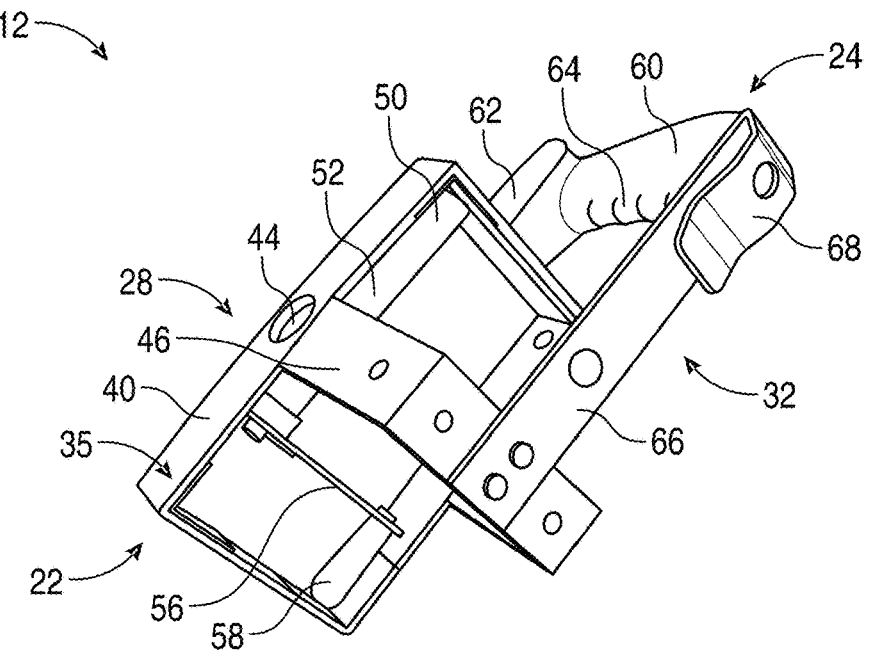

FIG. 2A and FIG. 2B show a side perspective view and a bottom perspective view, respectively of strap winding apparatus 12, in accordance with one embodiment of the present invention. Strap winding apparatus 12 includes a first end 22, a second end 24, a first side 26, a second side 28, a top end 30 and a second end 32. First end 22 indicates a front end and second end 24 indicates a rear end, or vice versa. First side 26 indicates a right side and second side 28 indicates a left side, or vice versa. Strap winding apparatus 12 includes a bracket 35. FIG. 3 shows a perspective view of bracket 35, in accordance with one embodiment of the present invention. Bracket 35 includes a frame 40 made of metal, hard plastic, or any other suitable material. In one example, frame 40 comes in a rectangular, square or any other configuration. Frame 40 has a frame opening 42 formed therein. Frame opening 42 indicates the space within the walls of (rectangular) frame 40. Further, frame 40 includes frame slots 44 formed at opposite sides of rectangular frame 40. In one example, frame slots 44 are formed at longer sides of rectangular frame 40. Further, frame 40 includes a U-shaped member 46. U-shaped member 46 extends from frame 40 towards second end 32. In one example, U-shaped member 46 is made of metal, hard plastic, or any other suitable material.

In one embodiment, strap winding apparatus 12 includes a rotating shaft assembly 50. Rotating shaft assembly 50 is configured to be positioned within bracket 35, as shown in FIG. 2A and FIG. 2B. FIG. 4 shows a perspective view of rotating shaft assembly 50, in accordance with one embodiment of the present invention. Rotating shaft assembly 50 includes a shaft 52 having shaft openings 54. Shaft openings 54 indicate plural elongated slots extending along the length of shaft 52 at the top and bottom for receiving strap 20, Further, shaft 52 has a crank 56. Crank 56 presents a grip or lever 58. Grip 58 extends perpendicularly from crank 56.

Refereeing back to FIG. 2A and FIG. 2B, bracket 35 includes a handle member 60 extending from said frame 40 allowing a user to hold and operate said strap winding apparatus. In one example, handle member 60 connects to frame 40 via an extending member 62. As can be seen from FIG. 3, extending member 62 acts as a connecting bridge between handle member 60 and frame 40 and allows handle member 60 to be positioned in perpendicular or an angle for holding strap winding apparatus 12. In one example, handle member 60 presents a finger grip section 64 allowing user 18 to hold handle member 60. Further, bracket 35 has a support member 66. Support member 66 indicates an elongated member in a flat configuration that extends from the bottom of handle member 60 and connects to U-shaped member 46. Support member 66 comes in contact with bed 16 and helps to rest frame 40 and U-shaped member 46 at a distance from bed 16. Handle member 60 includes a hook member 68. Hook member 68 positions perpendicularly to handle member 60 and has an angle-end, as shown in FIG. 2B, for example.

Figure 6:
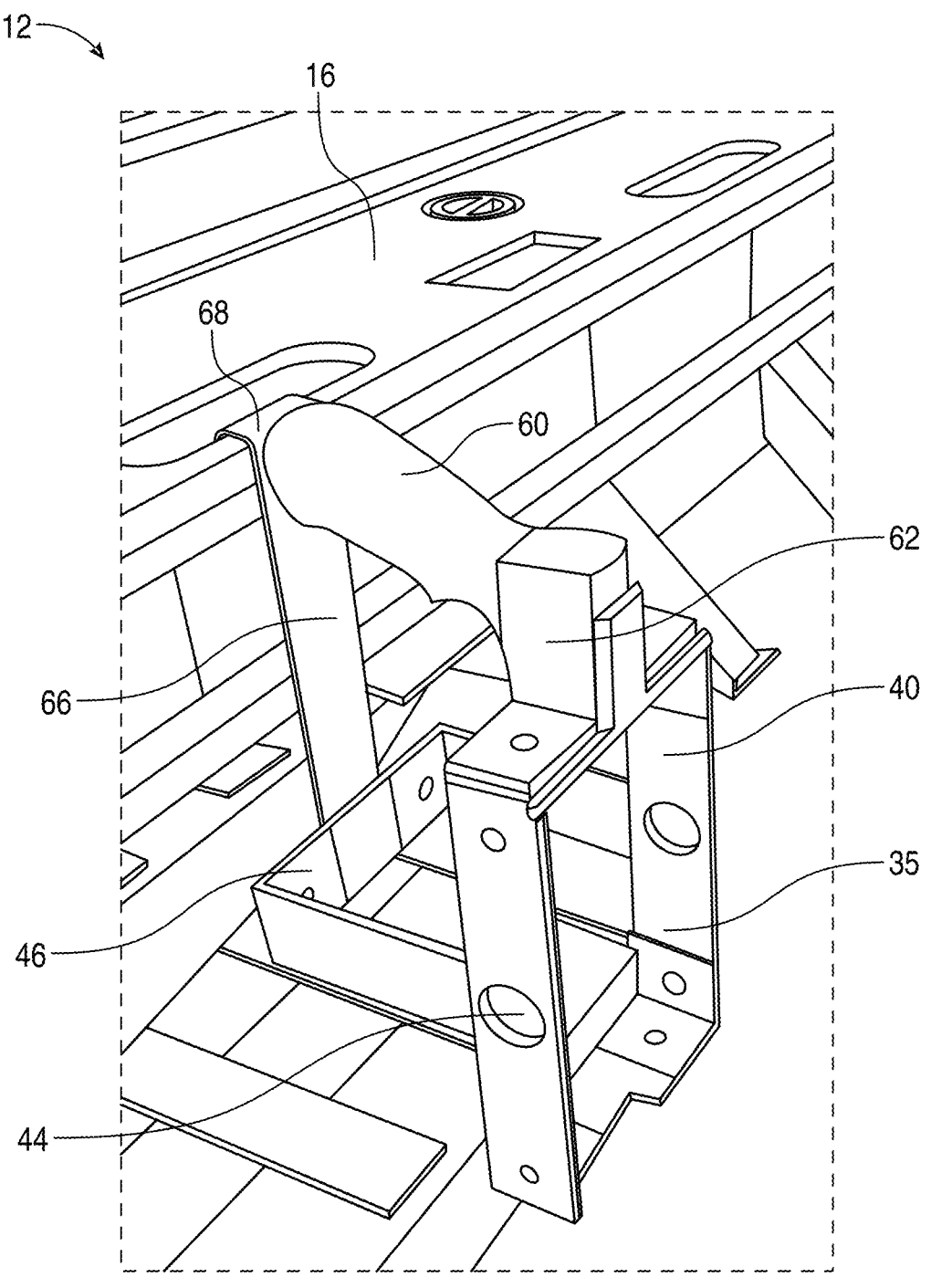
FIG. 6 illustrates the strap winding apparatus connected to a flatbed truck, in accordance with one embodiment of the present invention.

In accordance with the present invention, rotating shaft assembly 50 sits within frame 40 when not in use, as shown in FIG. 2A and FIG. 2B. Further, rotating shaft assembly 50 removes from frame 40 and shaft 52 inserts in frame slots 44 of frame 40 from the side, as shown in FIG. 5. FIG. 6 shows a perspective view of bracket 35 mounted to bed 16. As can be seen, hook member 68 inserts in holes provided at bed 16 and positions frame 40 facing downwards. Here, support member 66 mounts contacting the side surface of bed 16 and provides required support for holding frame 40 in place with the help of U-shaped member 46. Further, U-shaped member 46 and handle member 60 help to position frame 40 at a distance from bed 16 such that a larger strap 20 can be wound using strap winding apparatus 12.

Figure 7:
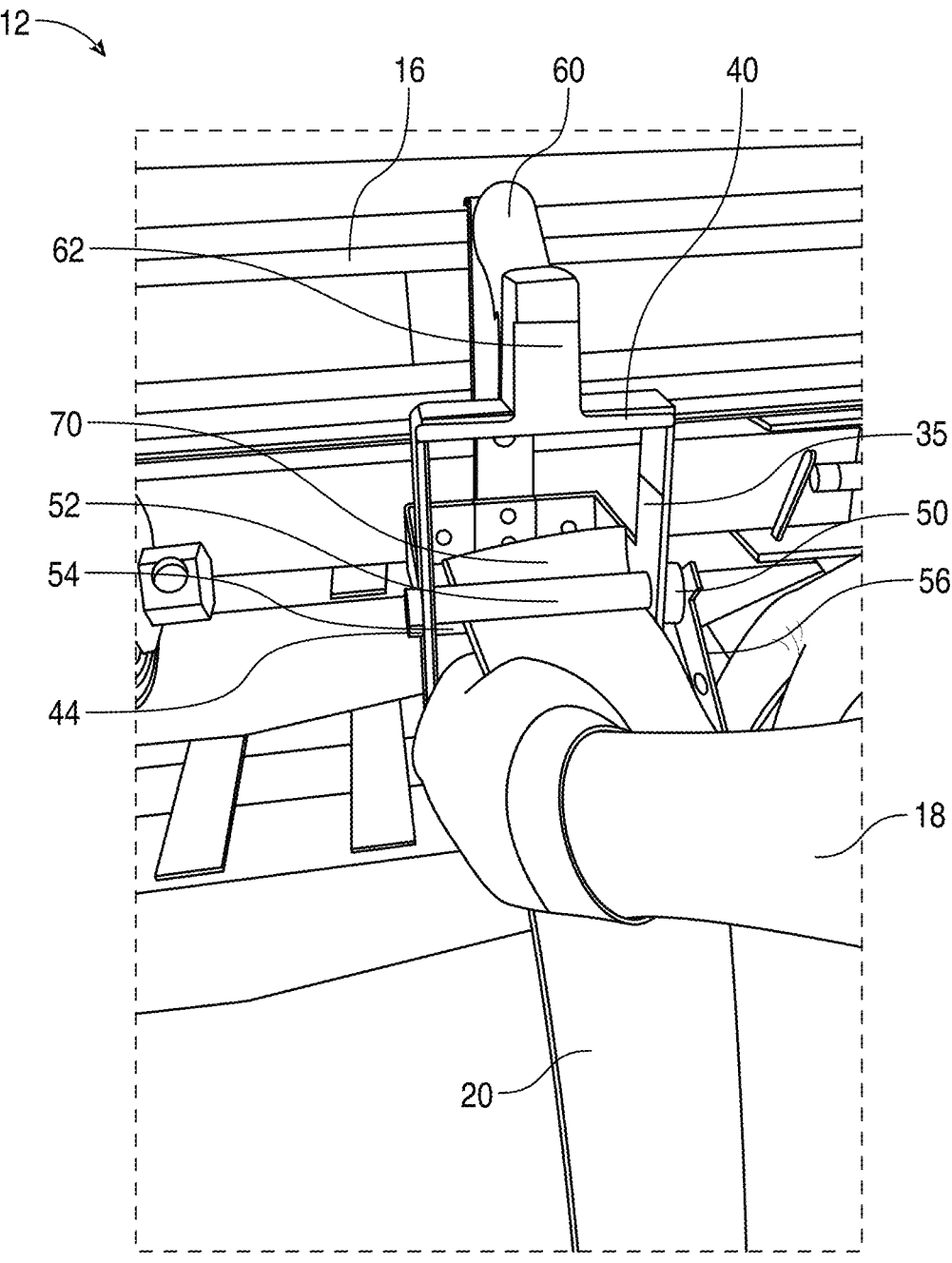
FIG. 7 illustrates the strap winding apparatus receiving a strap, in accordance with another embodiment of the present invention.
Figure 8:
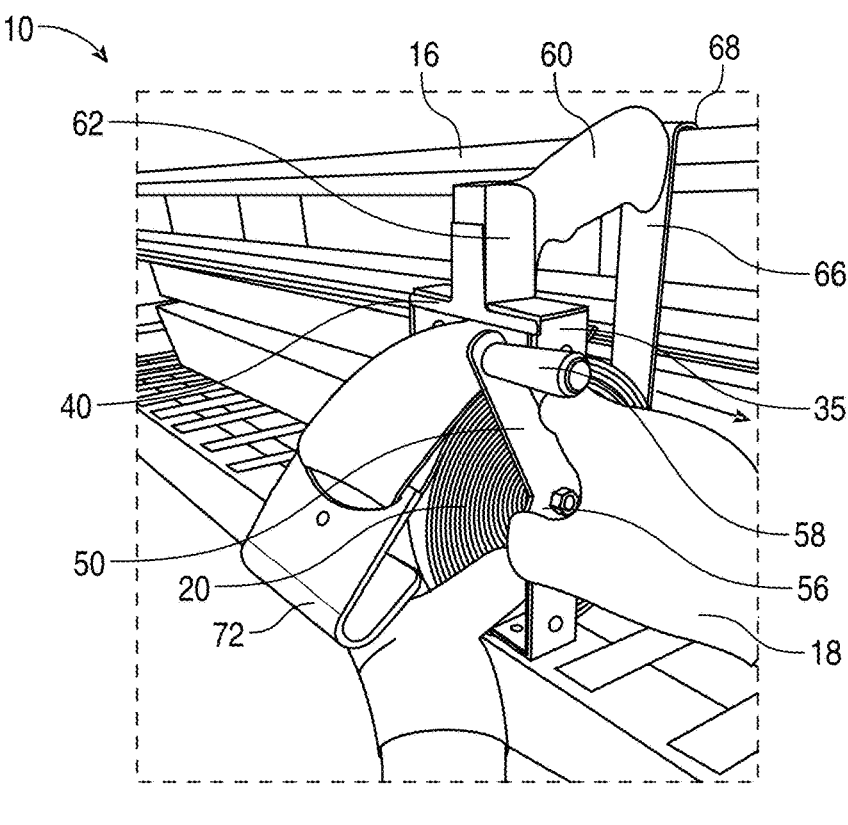
FIG. 8 illustrates the rotating shaft assembly being pulled out of the bracket, in accordance with one embodiment of the present invention.
Figure 9:
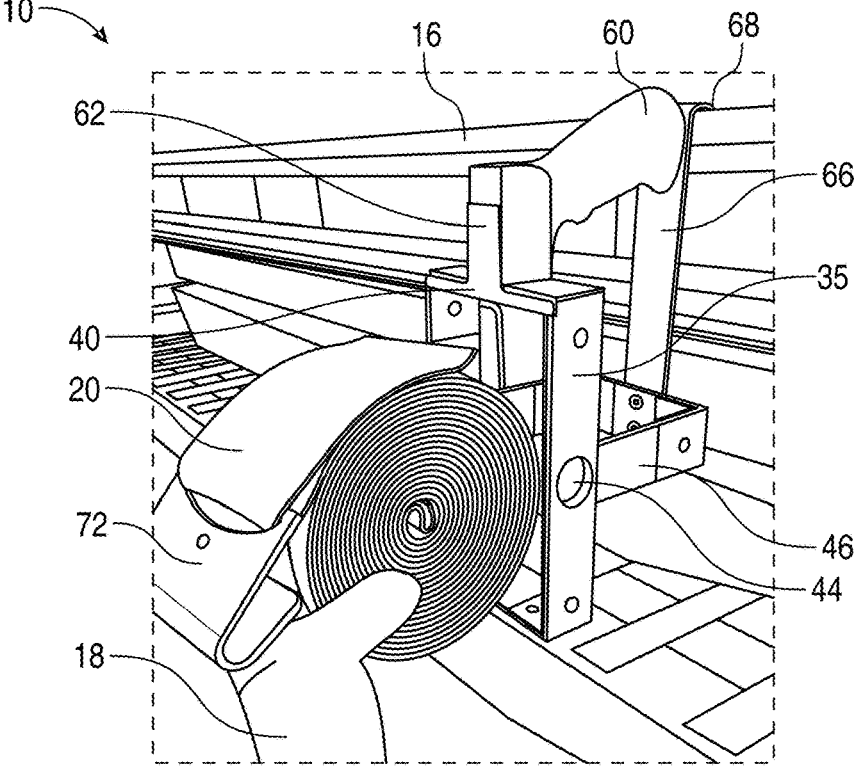
FIG. 9 illustrates the strap in a wounded configuration, in accordance with one embodiment of the present invention.

After mounting bracket 35, rotating shaft assembly 50 inserts in frame 40 via frame slots 44. Specifically, shaft 52 inserts through frame slot 44 from one side and connects to frame slot 44 on the other side. Subsequently, a distal end 70 of strap 20 draws through shaft openings 54, as shown in FIG. 7. Further, user 18 rotates rotating shaft assembly 50 holding grip 58 in order to wind strap 20 around shaft 52 until a strap hook 72 of strap 20 reaches, as shown in FIG. 8. At this point, user 18 holds strap 20 and pulls out rotating shaft assembly 50. Specifically, user 18 pulls out shaft 52 from frame 40. As shaft openings 54 are open ended, strap 20 stays inside frame 40 while shaft 52 is being pulled away from frame 40, as shown in FIG. 8. Subsequently, user 18 collects strap 20 in a wound configuration as shown in FIG. 9.

Figure 10:
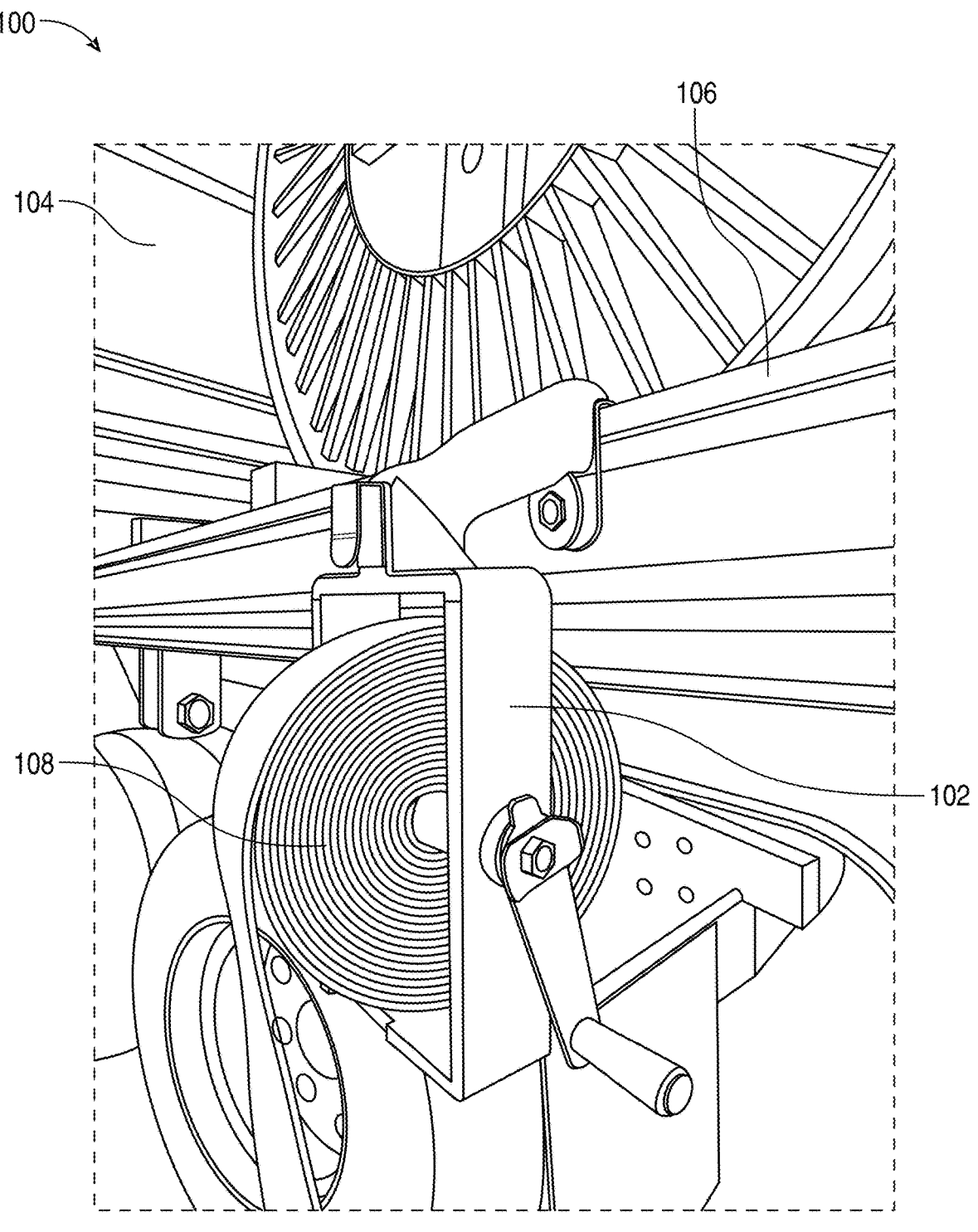
FIG. 10 illustrates an environment in which a strap winding apparatus implements, in accordance with another embodiment of the present invention.

Now referring to FIG. 10, an environment 100 in which a strap winding apparatus 102 implements, in accordance with one embodiment of the present invention. Strap winding apparatus 102 connects to a truck 104 at its bed 106 for winding a strap 108. Strap 108 indicates a cargo strap or a tie-down strap. In one example, strap 108 includes, but not limited to, a ratchet strap with flat hook, a ratchet strap with wire hook, a chain anchor ratchet strap, a lasso strap, etc.

Figure 11:
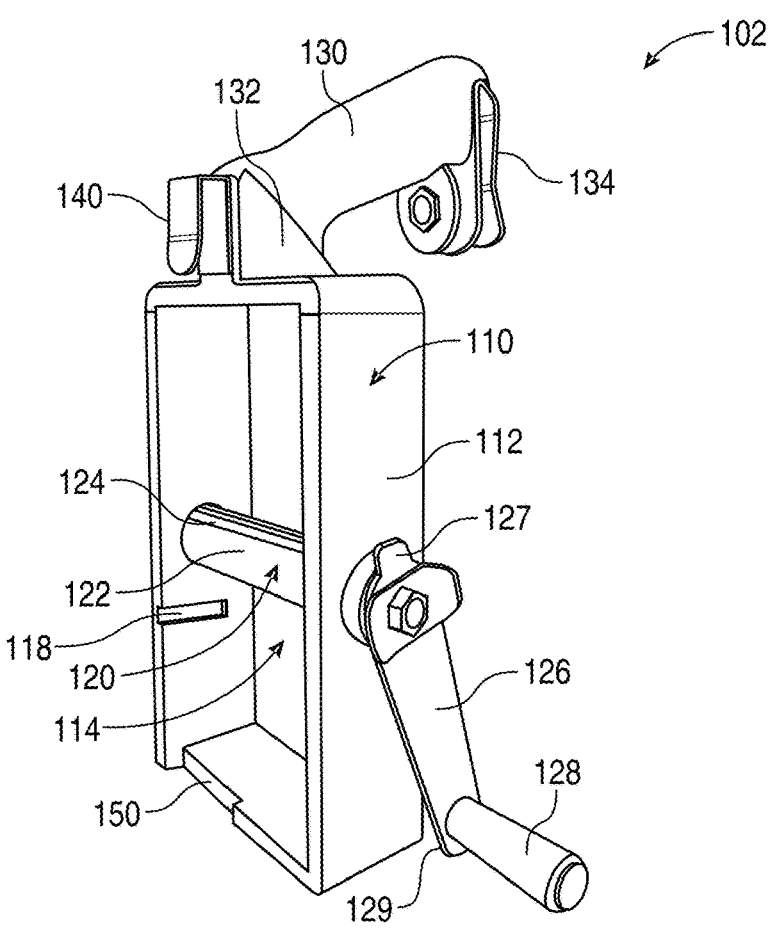
FIG. 11 illustrates a side perspective view of the strap winding apparatus, in accordance with another embodiment of the present invention.
Figure 12:
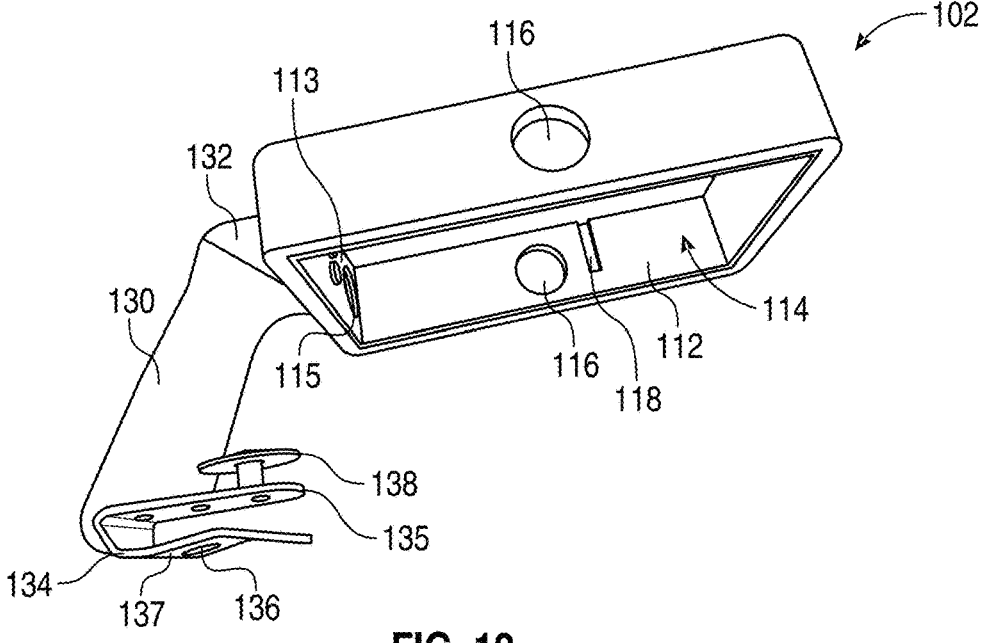
FIG. 12 illustrates a side perspective view of a bracket of the strap winding apparatus, in accordance with another embodiment of the present invention.
Figure 16:
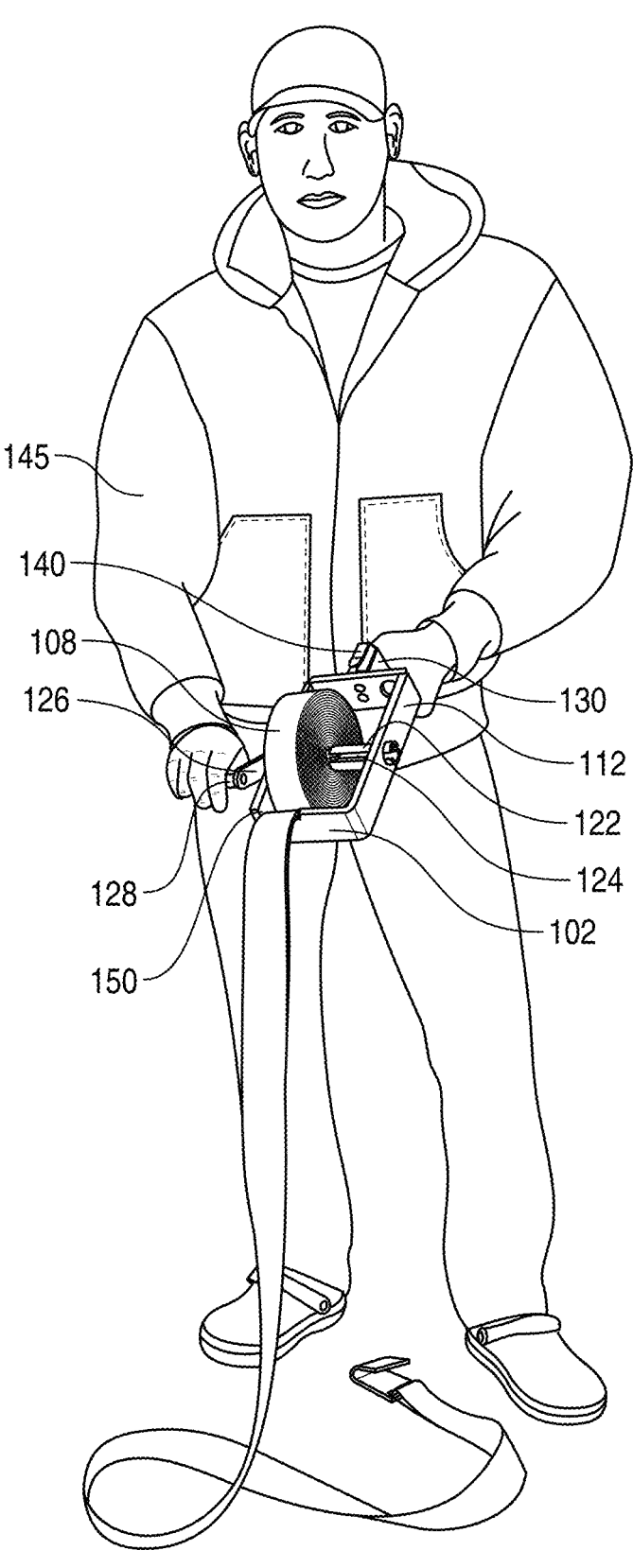
FIG. 16 illustrates a user holding the strap winding apparatus for winding the strap, in accordance with another embodiment of the present invention.

FIG. 11 shows a side perspective view strap winding apparatus 102, in accordance with one embodiment of the present invention. Strap winding apparatus 102 includes a bracket 110 and a rotating shaft assembly 120. FIG. 12 shows a side perspective view of bracket 110. Now referring to FIG. 11 and FIG. 12, the constructional features of bracket 110 are explained. Bracket 110 includes a frame 112 made of metal, hard plastic, or any other suitable material. In one example, frame 112 comes in a rectangular, square or any other configuration. Frame 112 has a frame opening 114 formed therein. Frame opening 114 indicates the space within the walls of (rectangular) frame 112. Further, frame 112 includes frame slots 116 formed at opposite sides of rectangular frame 112. In one example, frame slots 116 are formed at longer sides of rectangular frame 112. In one embodiment, frame 112 includes a plate member 113. Plate member 113 connects at the inner side of frame 112 and includes a circular opening 115. Further, frame 112 includes crank receiving cut-sections 118. Crank receiving cut-sections 118 are formed at the inner side of frame 112 facing each other. Circular opening 115 and crank receiving cut-sections 118 help to place rotating shaft assembly 120 within frame 112 when strap winding apparatus 102 is not in use, as shown in FIG. 16, for example.

Further, bracket 110 presents a handle member 130. Handle member 130 connects to frame 112 via an extending member 132. As can be seen from FIG. 12, extending member 132 acts as a connecting bridge between handle member 130 and frame 112 and allows handle member 130 to be positioned in perpendicular or at an angle with respect to bed 106 for holding strap winding apparatus 102. Further, bracket 110 includes a hook member 134. FIG. 13A shows an expanded view of hook member 134 connecting perpendicularly to handle member 130. As can be seen, hook member 134 presents a U-shaped structure having a top part 135 and a bottom part 137. In one example, bottom part 137 presents a hole 136. Hole 136 helps to receive a fastening member (not shown) when hook member 134 is connected to truck 104. Optionally, top part 135 encompasses a connecting member 138 with threaded portion 139. Connecting member 138 is tightened or adjusted when hook member 134 is connected to truck 104 depending on the need. In one exemplary embodiment, handle member 130 encompasses an auxiliary connector 140 at the opposite end relative to hook member 134. Auxiliary connector 140 indicates a hook or clip used for connecting bracket 110 to a structure (not shown) such as a wall hook when not in use, or configured to removably attach the strap winding apparatus to a user's belt or other external support for convenient storage and transport.

Referring to FIGS. 13B and 13C, bottom part 137 presents a rail receiving portion 137a. Here, bottom part 137 includes a sharp-cornered portion 137b. Rail receiving portion 137a receives a rail 107 of bed 106. In one example, sharp-cornered portion 137b comes in a U-shape. Sharp-cornered portion 137b allows to lock handle member 130 to bed 106 such that strap winding apparatus 12 mounts perpendicularly to bed 106, as shown in FIG. 10, for example. Sharp-cornered portion 137b allows hook member 134 to act as a clip for connecting handle member 130 to bed 106.

Rotating shaft assembly 120 is configured to be positioned within bracket 110. Rotating shaft assembly 120 includes a shaft 122 having shaft openings 124. Shaft openings 124 indicate elongated slots extending along the length of shaft 122 at the top and bottom for receiving strap 108. Further, shaft 122 has a crank 126. Crank 26 extends perpendicularly from shaft 122. Further, crank 126 presents a grip 128. Grip 128 extends perpendicularly from crank 126. Crank 126 extends perpendicularly from shaft 122. In one example, crank 126 has an extending member 127. Extending member 127 configures to sit in crank receiving cut-sections 118 in frame 112 when not in use, as shown in FIG. 16, for example. Crank connecting member 127 presents a Further, crank 126 presents a grip 128. Grip 128 extends perpendicularly from crank 126. Crank 126 includes a crank tip 129.

Figure 14:
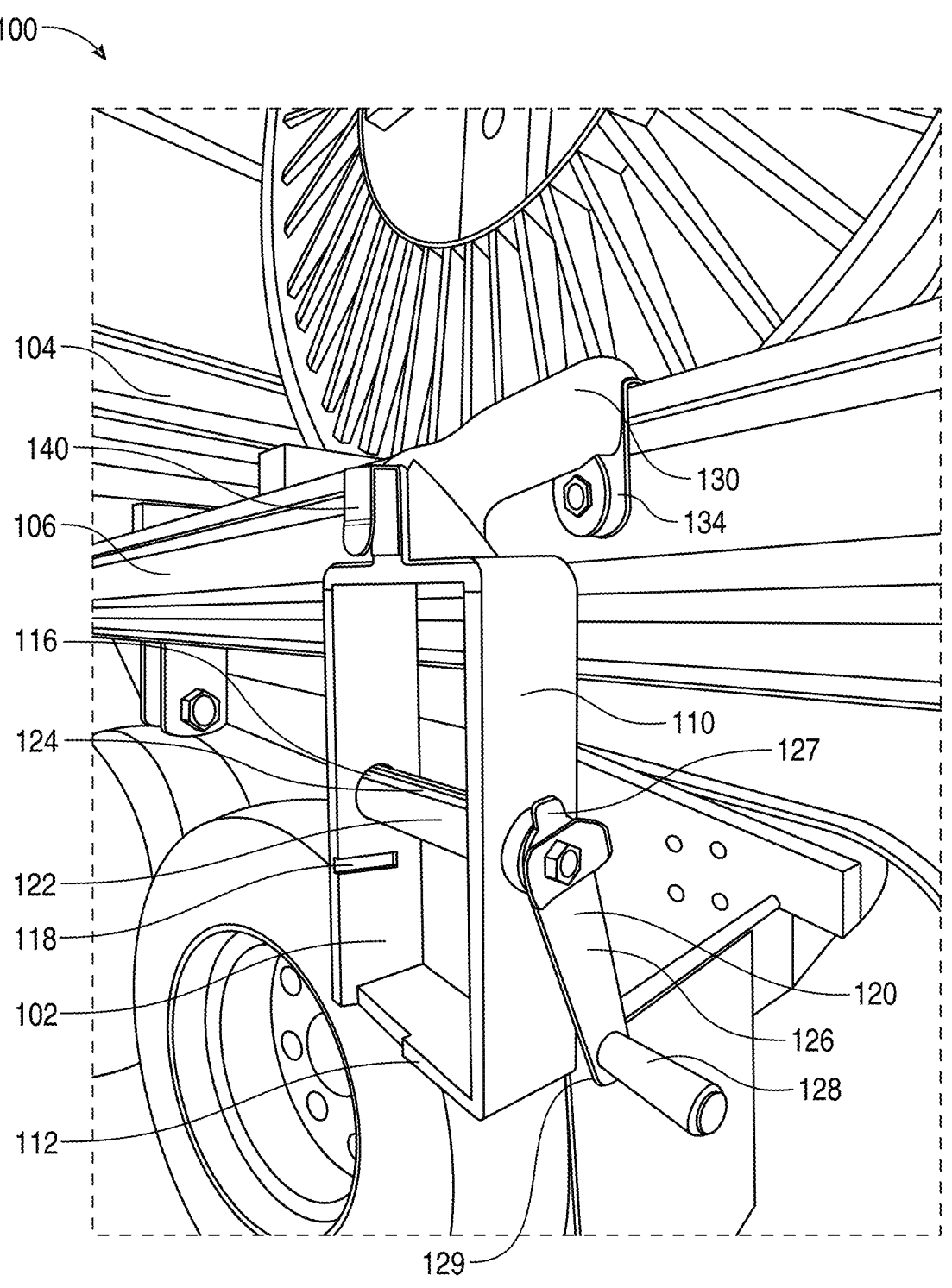
FIG. 14 illustrates the strap winding apparatus connected to a flatbed truck, in accordance with another embodiment of the present invention.
Figure 15:
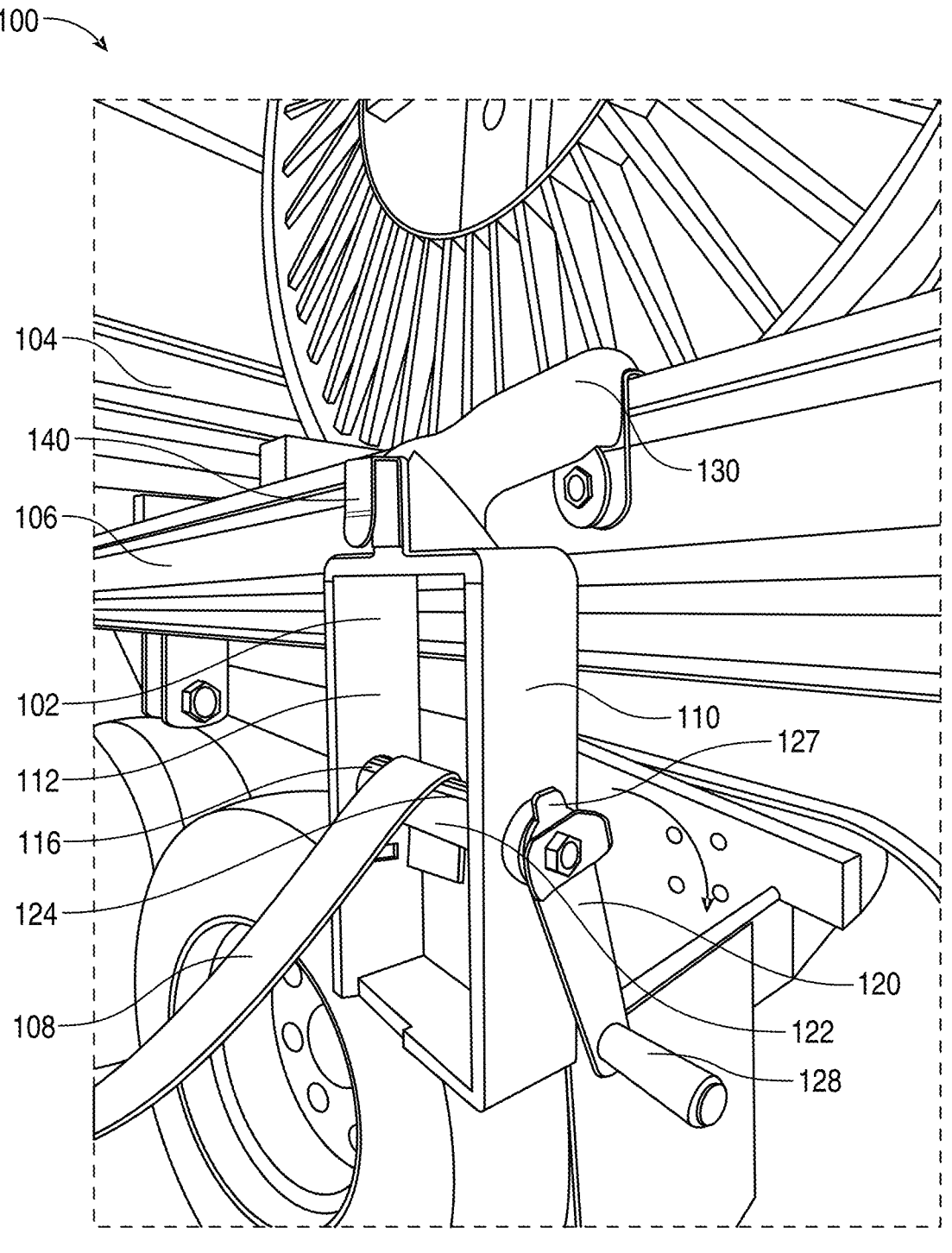
FIG. 15 illustrates a strap being wounded with the help of the strap winding apparatus receiving a strap, in accordance with another embodiment of the present invention.

Now referring to FIG. 14 and FIG. 15, the operation of strap winding apparatus 102 for winding strap 108 is explained, in accordance with one embodiment of the present invention. FIG. 14 shows a perspective view of bracket 110 mounted to bed 106. Here, hook member 134 inserts in holes provided at bed 106 and positions frame 112 facing downwards. Here, handle member 130 provides sufficient strength to hold frame 112, rotating shaft assembly 120 and strap 108. As can be seen, handle member 130 helps to position frame 112 at a distance from bed 106 such that strap 108 of various sizes can be wound using strap winding apparatus 102.

After mounting bracket 110, rotating shaft assembly 120 inserts into frame 112 via frame slots 116. Specifically, shaft 122 inserts in frame 112 via frame slots 116. Subsequently, strap 108 inserts through frame slots 116, as shown in FIG. 15. Further, rotating shaft assembly 120 rotates with the help of grip 128. Rotating grip 128 causes strap 108 to roll/wind up around shaft 122. After winding strap 108 around shaft 122, a user holds strap 108 and pulls out rotating shaft assembly 120 i.e., pulls out shaft 122 from frame 112, as explained above. As shaft openings 124 are open ended at the distal end of shaft 122, strap 108 stays inside frame 112 while shaft 122 is being pulled away from frame 112. Subsequently, the user collects strap 108 in a wound configuration.

Figure 17:
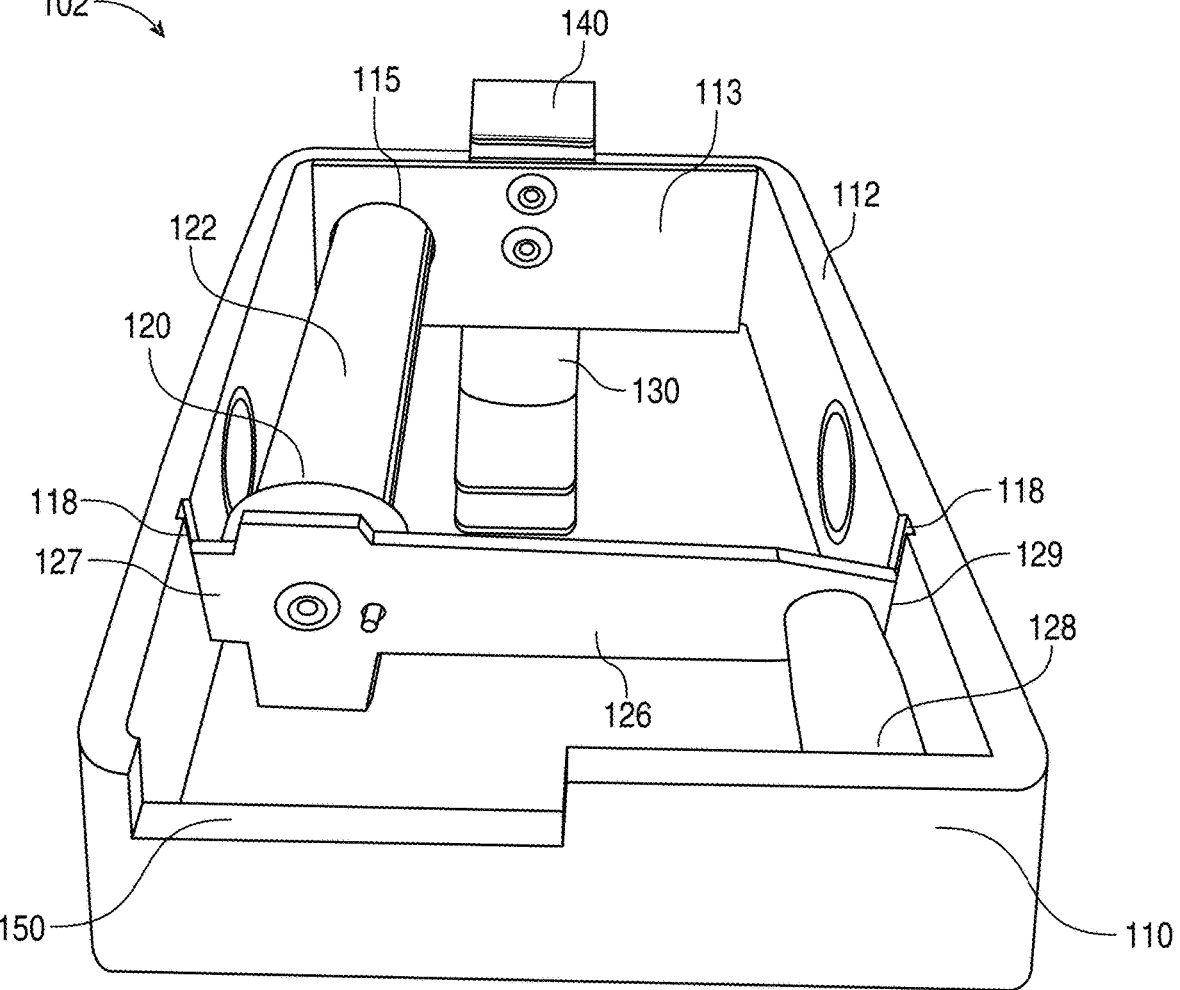
FIG. 17 illustrates a rotating shaft assembly placed within a frame when not in use, in accordance with another embodiment of the present invention.

In one exemplary embodiment, a user 145 holds handle member 130 and positions the strap 108 into shaft openings 124. Subsequently, user 145 rotates crank 126 holding grip 128 in order to wind strap 108 around shaft 122, as shown in FIG. 16. Here, strap 108 travels via a frame cut-section 150 to avoid strap 108 from traveling over frame 112. After winding strap 108, user 145 removes shaft 122 and takes out the wounded strap 108. The present example is presented to show that strap winding apparatus 102 can be used to wind strap 108 by connecting strap winding apparatus 102 to truck 104 or by holding strap winding apparatus 102 in hand depending on the need. FIG. 17 shows the feature of rotating shaft assembly 120 positioned within frame 112 when not in use. As can be seen, the tip of shaft 122 sits in circular opening 115. Further, extending member 127 and crank tip 129 are made to sit in crank receiving cut-sections 118 such that rotating shaft assembly 120 firmly sits in frame 112 when strap winding apparatus 102 is not in use. This way, strap winding apparatus 102 helps to save extra space needed for storing rotating shaft assembly 120.

The presently disclosed strap winding apparatus provides several advantages over the prior art. The strap winding apparatus helps to mount a frame for receiving a strap at a distance from the bed. This allows more space between the frame and the bed and provides a larger room for winding straps of various sizes. The strap winding apparatus has a hook member that removably connects to the bed of the flatbed truck. As a result, the strap winding apparatus is very easy to install and uninstall. The frame is firmly supported by handle member and support member, as a result, even if the user exerts more pressure while winding, the strap winding apparatus can withstand the pressure. The strap winding apparatus presents a frame that is configured to fit the rotating shaft assembly within when not in use. As a result, the strap winding apparatus takes up less storage space and is easy to transport.

A person skilled in the art appreciates that the strap winding apparatus can come in a variety of shapes and sizes depending on the need and comfort of the user. Further, many changes in the design and placement of components may take place without deviating from the scope of the presently disclosed strap winding apparatus.

In the above description, numerous specific details are set forth such as examples of some embodiments, specific components, devices, methods, in order to provide a thorough understanding of embodiments of the present invention. It will be apparent to a person of ordinary skill in the art that these specific details need not be employed, and should not be construed to limit the scope of the invention.

In the development of any actual implementation, numerous implementation-specific decisions must be made to achieve the developer's specific goals, such as compliance with system-related and business-related constraints. Such a development effort might be complex and time-consuming, but may nevertheless be a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

The foregoing description of embodiments is provided to enable any person skilled in the art to make and use the invention. Various modifications to these embodiments will be readily apparent to those skilled in the art, and the novel principles and invention disclosed herein may be applied to other embodiments without the use of the innovative faculty. It is contemplated that additional embodiments are within the spirit and true scope of the disclosed invention.

What is claimed is:

1. A strap winding apparatus, comprising:
a bracket comprising a closed rectangular frame having frame holes;
a rotating shaft assembly comprising a shaft and a crank, wherein said crank extends perpendicularly from one end of said shaft, and
wherein said shaft comprises shaft openings,
wherein said shaft openings comprise a plurality of elongated slots extending along a length of said shaft and including open ends configured for receiving a strap and facilitating removal of said shaft from said frame while retaining said strap in a wound configuration; and a handle member extending from said frame,
  the handle member being configured to allow a user
    to hold and operate the strap winding apparatus;
wherein the shaft inserts through said frame holes while
  positioning said crank outside of said frame, wherein
  said shaft openings receive a strap, and wherein said
  shaft is rotated via said crank to wind said strap
  around said shaft,
wherein said frame comprises crank receiving cut-
  sections formed on inner sides of said frame facing
  each other, the crank receiving cut-sections being
  configured to receive distal ends of said crank and
  thereby allow said rotating shaft assembly to be
  positioned and secured within said frame when not in
  use.

2. A strap winding apparatus, comprising:
a bracket comprising a closed rectangular frame having
  frame holes;
a rotating shaft assembly comprising a shaft and a crank,
  wherein said crank extends perpendicularly from one
    end of said shaft, and
  wherein said shaft comprises shaft openings, wherein said shaft openings comprise a plurality of
  elongated slots extending along a length of said
  shaft and including open ends configured for
  receiving a strap and facilitating removal of said
  shaft from said frame while retaining said strap in
  a wound configuration; and
a handle member extending from said frame,
  the handle member being configured to allow a user
    to hold and operate the strap winding apparatus;
wherein the shaft inserts through said frame holes while
  positioning said crank outside of said frame, wherein
  said shaft openings receive a strap, and wherein said
  shaft is rotated via said crank to wind said strap
  around said shaft,
wherein said frame comprises a plate member attached
  to an inner side of said frame, the plate member
  including a circular opening aligned to receive a
  portion of said rotating shaft assembly, such that said
  shaft assembly is retained within said frame when
  not in use.

* * * * *